United States Patent
Taniguchi

(10) Patent No.: US 8,144,374 B2
(45) Date of Patent: Mar. 27, 2012

(54) AUTO DOCUMENT FEEDER AND IMAGE SCANNING APPARATUS

(75) Inventor: Shoichi Taniguchi, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/410,057

(22) Filed: Mar. 24, 2009

(65) Prior Publication Data

US 2009/0251743 A1    Oct. 8, 2009

Related U.S. Application Data

(60) Provisional application No. 61/042,225, filed on Apr. 3, 2008.

(51) Int. Cl.
*H04N 1/04* (2006.01)

(52) U.S. Cl. ......... 358/474; 358/497; 358/498; 358/496

(58) Field of Classification Search ............... 358/474, 358/497, 498, 496
See application file for complete search history.

(56) References Cited

U.S. PATENT DOCUMENTS

| | | | |
|---|---|---|---|
| 7,038,819 B2* | 5/2006 | Fang et al. | 358/474 |
| 2004/0065991 A1 | 4/2004 | Watanabe et al. | |
| 2005/0195450 A1* | 9/2005 | Shoji | 358/497 |
| 2007/0009296 A1 | 1/2007 | Shoji | |

FOREIGN PATENT DOCUMENTS

| | | |
|---|---|---|
| JP | 11-177779 | 7/1999 |
| JP | 2000-292991 | 10/2000 |
| JP | 2003-207856 | 7/2003 |
| JP | 2007-189637 | 7/2007 |

* cited by examiner

*Primary Examiner* — Houshang Safaipour
(74) *Attorney, Agent, or Firm* — Patterson & Sheridan, LLP

(57) ABSTRACT

A gap indicator device is rotatably locked to an auto document feeder openably and closably installed to a scanner device of an image scanning apparatus, is rotated by being pressed by the scanner device, and includes a pointer or a scale to indicate a state of an image reading gap, as a gap between a platen guide and an image reading portion, through which an original document passes. The pointer or the scale is located at a position where it can be visually recognized from above when a cover of the auto document feeder is opened.

16 Claims, 9 Drawing Sheets

AUTO DOCUMENT FEEDER AND IMAGE SCANNING APPARATUS

CROSS-REFERENCE TO RELATED APPLICATIONS

This application is based upon and claims the benefit of priority from the prior U.S. patent application 61/042,225, filed on 3 Apr. 2008, the entire contents of which are incorporated herein by reference.

TECHNICAL FIELD

The present invention relates to an image scanning apparatus in which workability of operation of adjusting a gap of a reading portion of an auto document feeder is improved.

BACKGROUND

An auto document feeder (hereinafter referred to as an ADF) of an image scanning apparatus takes out an original document one by one, and conveys it to a reading portion of the image scanning apparatus. The ADF is provided with a conveying path having a gap necessary for the original document to be conveyed to the reading portion. When the gap is excessively wide, the reading accuracy of the original document becomes worse, and when the gap is excessively narrow, the original document gets jammed. Thus, it is important to ensure a suitable gap.

The gap between a conveying guide member of the ADF and the reading portion is adjusted by adjusting the height of the conveying guide member. In a related art image scanning apparatus, the operation of adjusting the height of the conveying guide member is performed while looking into the gap between the conveying guide member and the reading portion from the side, and therefore, the workability is bad.

In this point, JP-A-2007-189637 discloses a technique in which a recess for visual recognition of a gap between a conveying guide member of an ADF and a reading portion is provided in a main body cover of an image scanning apparatus incorporated in an image forming apparatus.

However, also in this technique, the operator must look into and confirm a gap of the reading portion of the ADF from the side, and there is a problem that the workability is bad.

SUMMARY

It is an object of the present invention to provide an image scanning apparatus including a gap indicator device having a pointer or a scale to indicate a state of an image reading gap, as a gap between a platen guide and an image reading portion, through which an original document passes.

In an aspect of the present invention, an auto document feeder openably and closably installed to a scanner device includes:

a document feed tray on which an original document is placed;

a document conveying mechanism to convey the original document one by one from the document feed tray to an image reading portion of a scanning unit;

a document storage tray on which the original document ejected by the document conveying mechanism is placed; and a gap indicator device that includes an indicator to indicate a state of an image reading gap, as a gap between a conveying guide member and the image reading portion, through which the original document passes, is rotatably locked to a frame, and is rotated by being pressed by the scanner device.

DETAILED DESCRIPTION

Throughout this description, the embodiments and examples shown should be considered as exemplars, rather than limitations on the apparatus and methods of the present invention.

Hereinafter, embodiments of an image scanning apparatus of the invention will be described in detail with reference to the drawings.

(Outline of Image Forming Apparatus)

Figure 1:
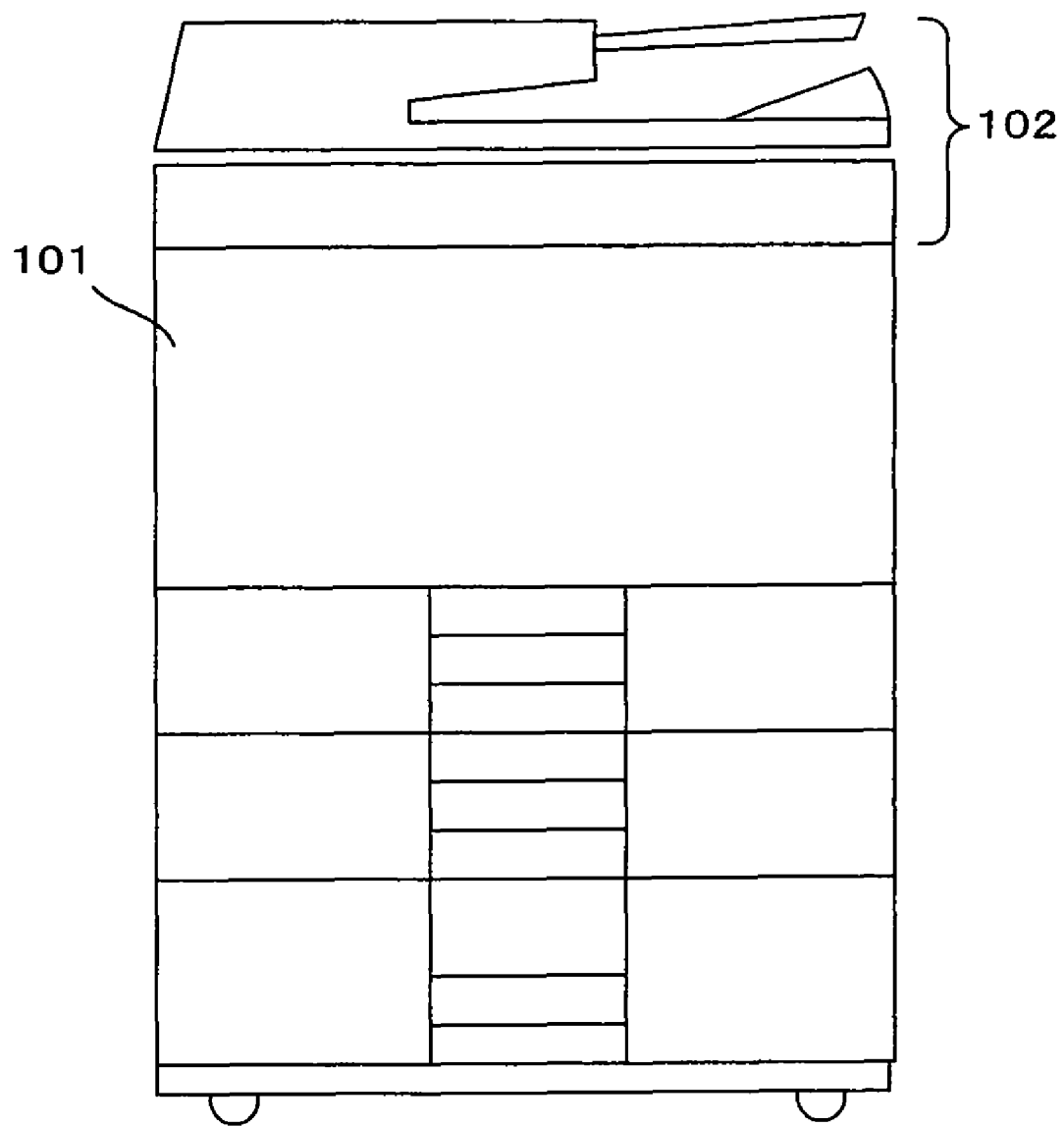
FIG. 1 is an outer appearance view of an image forming apparatus.

FIG. 1 is an outer appearance view of an image forming apparatus. As shown in FIG. 1, the image forming apparatus includes a main body apparatus 101 to form an image on a recording medium and an image scanning apparatus 102. The image scanning apparatus 102 includes an ADF 103 and a scanner device 104.

An image forming portion of the main body apparatus 101 may be an electrophotographic recording apparatus or an ink jet recording apparatus. Hereinafter, a description will be made while the electrophotographic recording apparatus is used as an example.

A document placement platen 105 formed of a transparent material such as a glass plate is provided at an upper part of the scanner device 104 incorporated in an upper part of the main body apparatus 101. The ADF 103 is openably and closably provided so as to cover the platen 105.

Figure 2:
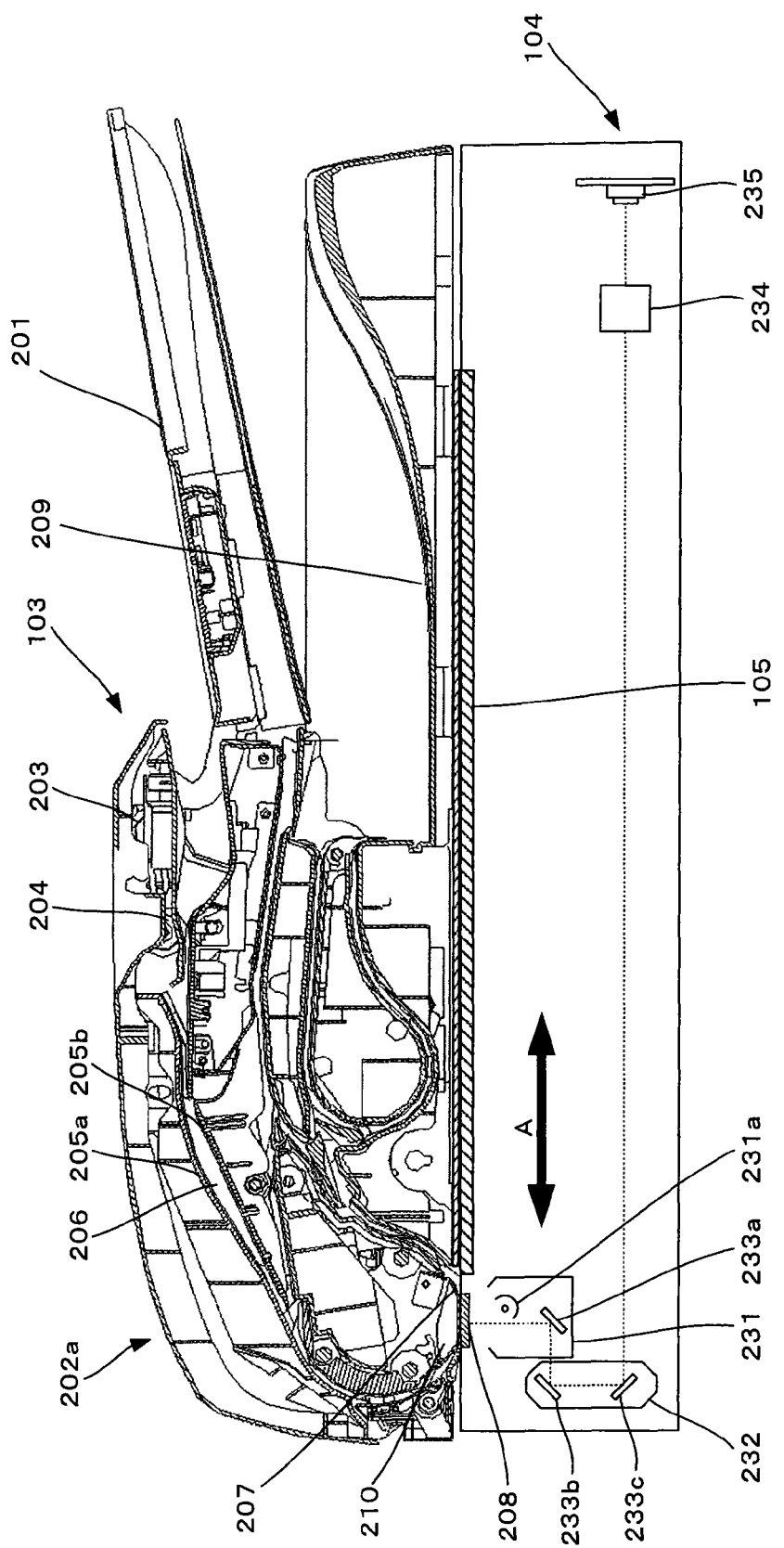
FIG. 2 is a side sectional view of an image scanning apparatus.

FIG. 2 is a side sectional view of the image scanning apparatus 102. As shown in FIG. 2, a scanning unit 231 to optically read an image of an original document placed on the platen 105 is provided at a lower surface side of a document stand of the scanner device 104. The scanning unit 231 is moved in an arrow A direction by a not-shown drive portion along the platen 105, and outputs image data corresponding to a reflected light image of the original document to an image forming engine.

An image forming portion is provided below the scanner device 104 including the scanning unit 231. The image forming portion includes a recording medium conveying mechanism, the image forming engine and a process unit.

The image forming engine includes an exposure unit to irradiate a laser beam. The process unit includes a photoconductive drum, a charging unit, a developing unit, and a transfer member such as a transfer belt.

The charging unit charges the surface of the photoconductive drum with a static charge. The exposure unit irradiates the laser beam to the charged photoconductive drum. An electrostatic latent image is formed on the surface of the photoconductive drum by this irradiation.

The developing unit supplies a developer such as toner to the photoconductive drum, and visualizes the electrostatic latent image. The visualized developer image is transferred to the transfer belt.

The transfer belt transfers the developer image to a recording medium conveyed by the recording medium conveying mechanism. The developer image transferred to the recording medium is heated, pressurized and fixed to the recording medium.

(Outline of the ADF)

As shown in FIG. 2, the ADF 103 is openably and closably installed to the scanner device 104 through a hinge 103a (see FIG. 3), and includes a document feed tray 201 on which an original document is placed, a document conveying mechanism 202a, and a document storage tray 209 on which an ejected original document is placed.

The operation of conveying an original document in the document conveying mechanism 202a will be described. A pickup roller 203 picks up an original document from the document feed tray 201. A separation roller 204 conveys only the uppermost original document from original documents picked up by the pickup roller 203.

A first document guide 205a and a second document guide 205b form a document conveying path 206 at the downstream side of the separation roller 204. The separation roller 204 conveys the original document to the document conveying path 206.

An ark-like conveying guide member (hereinafter referred to as a platen guide) 207 is provided downstream of the document conveying path 206. The platen guide 207 is opposite to an image reading portion 208 of the scanning unit 231 at the lowest position. The image reading portion 208 is formed of a transparent material such as a glass plate.

A free bracket 210 is disposed to a frame 200 (see FIG. 4) and includes a locating portion to locate a position of the platen guide 207 so that a gap (hereinafter referred to as an image reading gap) through which the original document passes is ensured between the platen guide 207 and the image reading portion 208.

The original document conveyed to the document conveying path 206 travels around the outer periphery of the platen guide 207, passes through the image reading gap, and is ejected to the document storage tray 209.

An image sensor of the scanning unit 231 is positioned at the image reading portion 208. A light 231a of the scanning unit 231 irradiates a light beam to the original document through the image reading portion 208. The light beam reflected by the original document is incident on a CCD 235 through a mirror 233a of the scanning unit 231, a mirror 233b of a reflection unit 232, a mirror 233c, and a magnifying lens block 234. The incident light beam is converted into an electric signal by the CCD 235.

Figure 3:
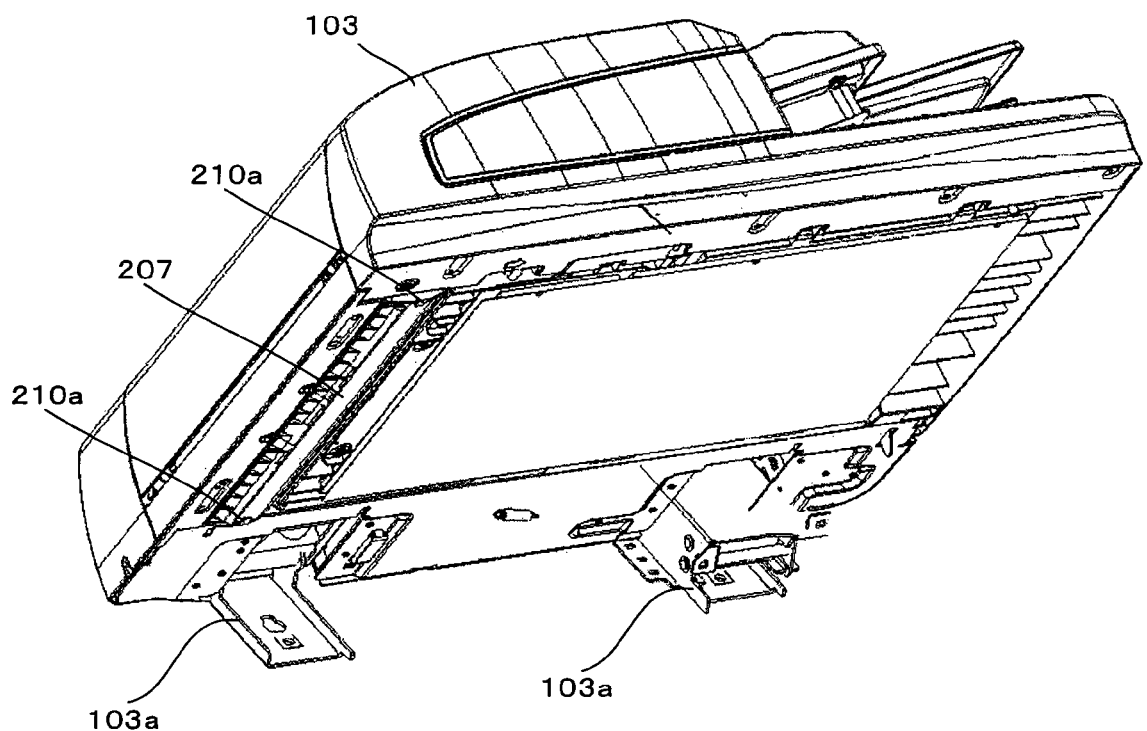
FIG. 3 is a perspective view showing a state where an ADF is opened.

FIG. 3 is a perspective view showing a state where the ADF 103 is opened. As shown in FIG. 3, the free bracket 210 is provided at both ends of the platen guide 207, that is, at the front side and the rear side. A locating portion 210a formed into a projecting shape at the free bracket 210 is sandwiched between the platen guide 207 and the image reading portion 208. Thus, the image reading gap equal to the thickness of the locating portion 210a is ensured.

(Gap Indicator Device)

The ADF 103 of the embodiment includes a gap indicator device to indicate a state of the image reading gap. The gap indicator device is rotatably locked to the frame 200 of the ADF 103. One end of the gap indicator device contacts with the scanner device 104. The gap indicator device is urged toward the image reading portion 208 of the scanner device 104 by an urging member or its own weight.

The gap indicator device includes a pointer or a scale which indicates that the image reading gap becomes narrow when the ADF 103 is closed in the direction of the scanner device 104 and contacts with the scanner device 104, and that the image reading gap becomes wide when the ADF is separated from the scanner device 104. The gap indicator device of the embodiment is located at a position where it can be seen from above when the cover 202a of the ADF 103 is opened. Accordingly, in an adjustment operation of the image reading gap which is performed while turning an adjustment screw (not shown) provided at an attachment portion of the hinge 103a at the rear side of the ADF 103, the adjustment can be performed while the ADF remains installed to the scanner device 104 and the pointer or the scale is confirmed from above. Thus, the workability is improved.

First Embodiment

Hereinafter, a first embodiment of a gap indicator device will be described. The gap indicator device of this embodiment is formed while the free bracket 210 is made a main body portion.

Figure 4:
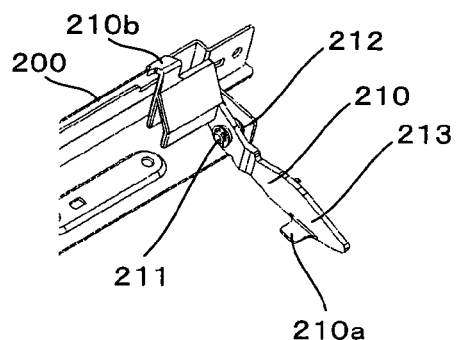
FIG. 4 is an outer appearance perspective view of a free bracket.
Figure 5:
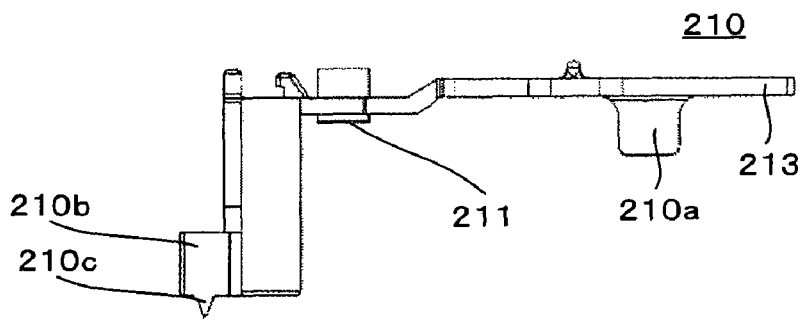
FIG. 5 is a top view of the free bracket.
Figure 6:
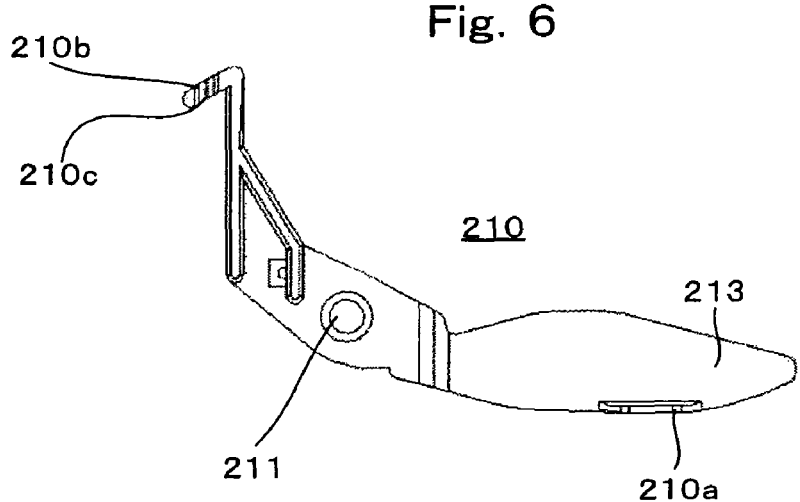
FIG. 6 is a side view of the free bracket.
Figure 7:
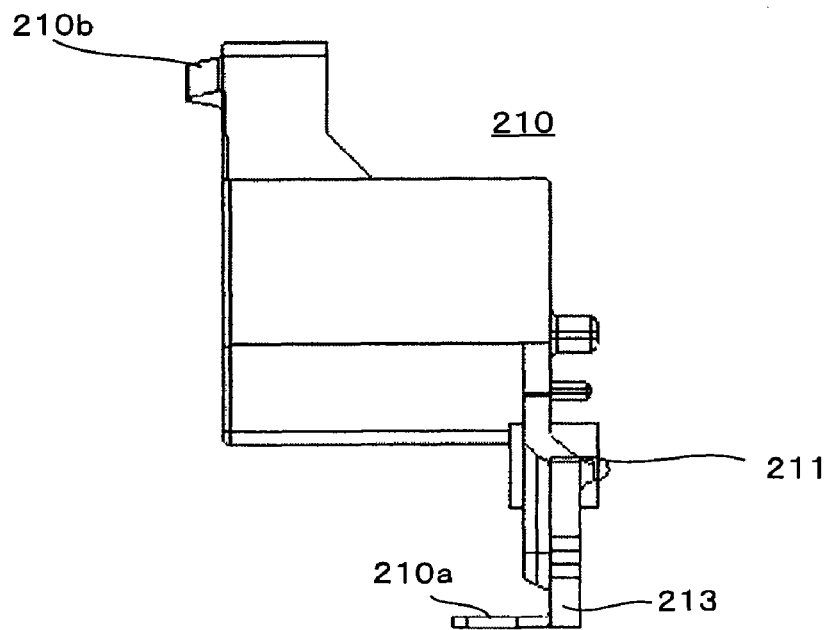
FIG. 7 is a front view of the free bracket.

FIG. 4 is an outer appearance perspective view of the free bracket 210 at the rear side of the ADF 103. FIG. 5 is a top view of the free bracket 210, FIG. 6 is a side view of the free bracket 210, and FIG. 7 is a front view of the free bracket 210. As shown in FIGS. 4 to 7, the free bracket 210 includes, at one end thereof, an actuating lever portion 213 having a curvature outer shape similar to the outer peripheral shape of the platen guide 207, and includes an indicator 210b at the other end. The indicator 210b includes a pointer 210c formed of a pointed end. The actuating lever portion 213 includes the locating portion 210a to regulate the image reading gap. The locating portion 210a is formed integrally with the actuating lever portion 213 or is formed of a separate member.

The free bracket 210 includes a locking portion 211 made of a shaft bush engaging with a shaft provided at the side end of the frame 200 of the ADF 103, and is rotatably locked. A torsion spring 212 as an urging member is fitted to the locking portion 211. The torsion spring 212 is provided between the frame 200 and the free bracket 210. The torsion spring 212 urges the free bracket 210 so that the actuating lever portion 213 rotates in the direction of the scanner device 104. As the urging member, an elastic member such as a plate spring or a coil spring may be used. Besides, the outer portion is formed so that the actuating lever portion 213 becomes heavy and the actuating lever portion may be rotated by its own weight.

Figure 8:
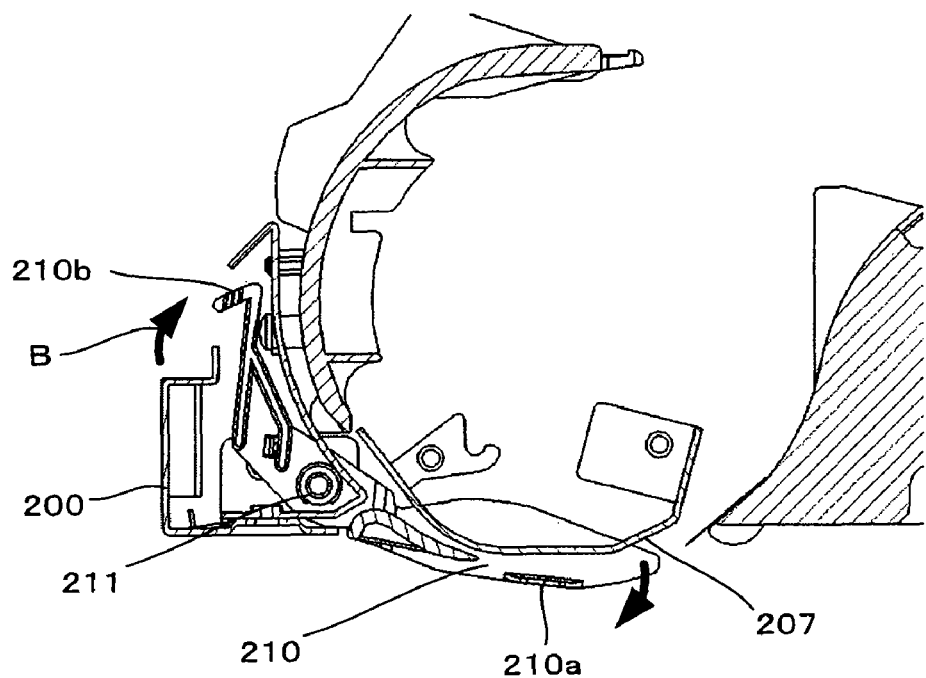
FIG. 8 is a view showing a state of the free bracket when an ADF is separate from a main body apparatus.

FIG. 8 is a view showing a state of the free bracket 210 when the ADF 103 is separate from the scanner device 104. As shown in FIG. 8, when the ADF 103 is separate from the image reading portion 208 of the scanner device 104 and the image reading gap becomes wide, the actuating lever portion 213 rotates downward. At this time, the free bracket 210 rotates while the locking portion 211 is made a fulcrum, and the indicator 210b rotates in an upper direction of an arrow B.

Figure 9:
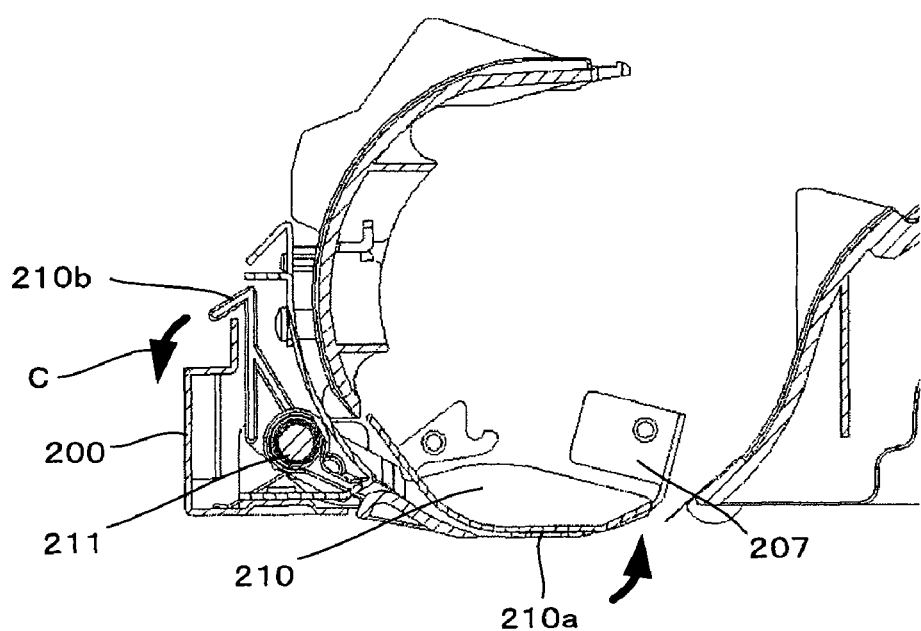
FIG. 9 is a view showing a state of the free bracket when the ADF is close to the main body apparatus.

FIG. 9 is a view showing a state of the free bracket when the ADF 103 is close to the image reading portion 208 of the scanner device 104. As shown in FIG. 9, when the ADF 103 approaches the scanner device 104 and the image reading gap becomes narrow, the actuating lever portion 213 is rotated upward by being pressed by the image reading portion 208 of the scanner device 104. At this time, the free bracket 210 rotates while the locking portion 211 is made a fulcrum, and the indicator 210b rotates in a downward direction of an arrow C.

Figure 10:
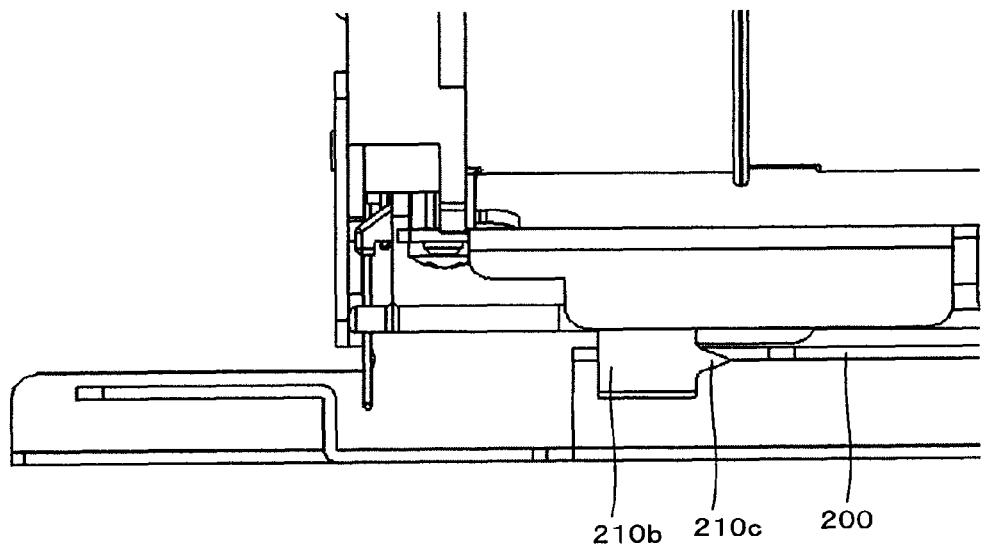
FIG. 10 is a view showing a state of a pointer when an image reading gap has a suitable thickness.

FIG. 10 is a view showing a state of the pointer 210c when the image reading gap is appropriate. As shown in FIG. 10, the pointer 210c of the indicator 210b is located at a position where it can be seen from above when the upper cover 202a of the document conveying mechanism 202 of the ADF 103 shown in FIG. 2 is opened. The pointer 210c indicates a specified position opposite to the end of the frame 200.

Figure 11:
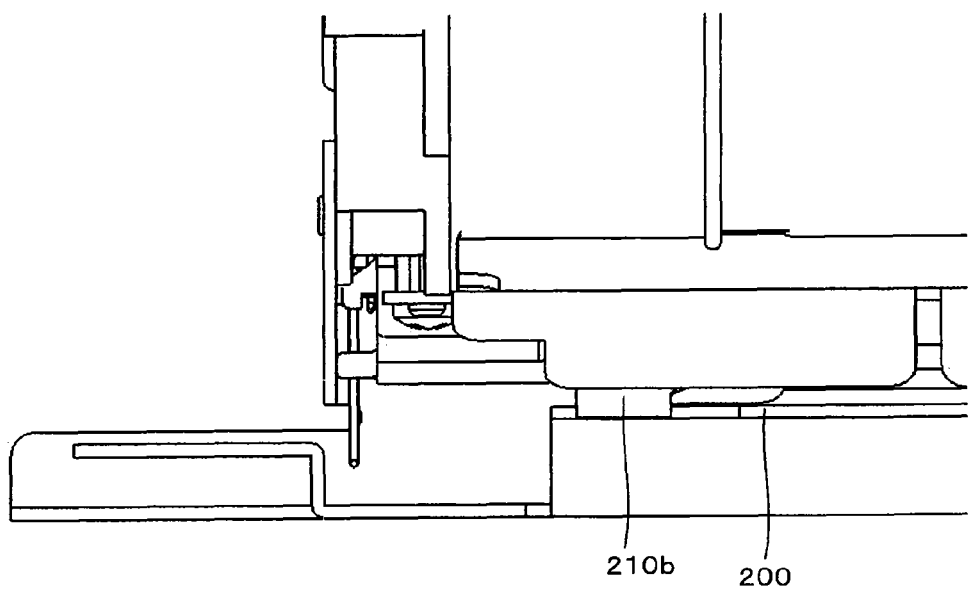
FIG. 11 is a view showing a state of the pointer when the image reading gap is excessively wide.

FIG. 11 is a view showing a state of the pointer 210c when the image reading gap is excessively wide. As shown in FIG. 11, the pointer 210c of the indicator 210b is shifted from the specified position, and it can be visually recognized that the image reading gap is excessively wide.

As stated above, the gap indicator device of the embodiment is rotatably locked to the frame 200 of the ADF 103, includes, at the one end thereof, the actuating lever portion 213 which is rotated by being pressed by the scanner device 104, and includes, at the other end, the pointer 210c which indicates the state of the image reading gap and is located at the position where it can be visually recognized from above the ADF 103.

Accordingly, the state of the image reading gap can be easily known by seeing the movement of the pointer 210c from above, and there is an effect that the workability of the operation of adjusting the image reading gap is improved.

Second Embodiment

A second embodiment is different from the first embodiment in that a scale 220 is provided on a frame 200 of an ADF 103. The scale 220 is provided to be close to a place where a pointed end of a pointer 210c is positioned.

Figure 12:
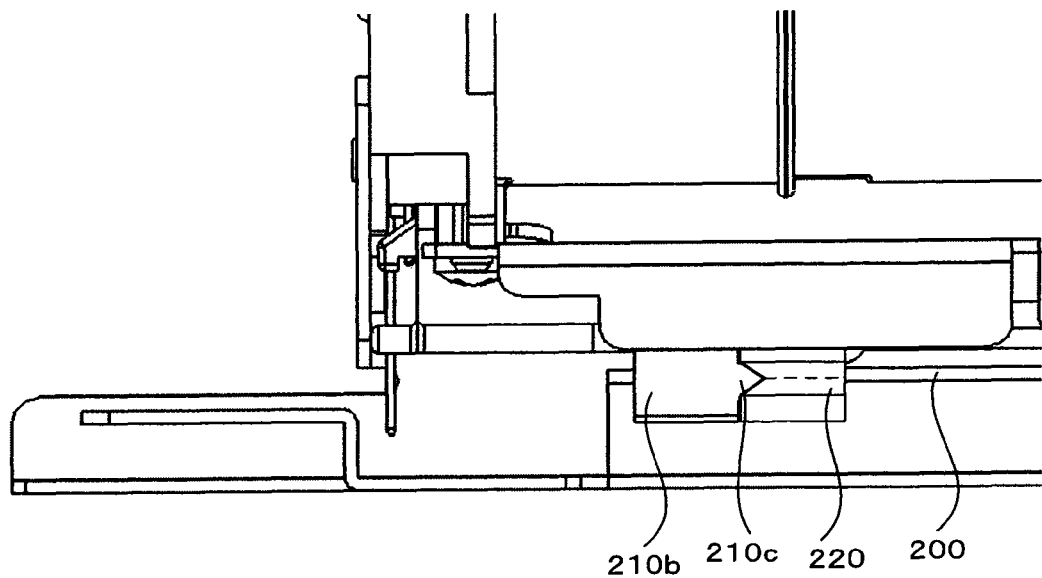
FIG. 12 is a view showing a pointer of a free bracket of a second embodiment.

FIG. 12 is a view showing the pointer 210c of an indicator 210b of a free bracket 210 of the second embodiment and the scale 220. As shown in FIG. 12, the scale 220 indicates an allowable range of an image reading gap. The allowable range can be made easily viewable by color coding. When the image reading gap at either the front side or the rear side of the ADF 103 is widened, the image reading gap can be adjusted while seeing the pointer 210c and the scale 220. The image reading gap can be easily adjusted while the image scanning apparatus 102 is installed to the main body apparatus 101.

As stated above, the gap indicator device of the embodiment includes the scale 220 at the position indicated by the pointer 210c. Thus, there is an effect that the workability of the operation of adjusting the image reading gap is further improved.

Third Embodiment

A third embodiment is different from the first embodiment in that a scale 220a is provided on an upper surface of an indicator 210b. The scale 220a is provided at a position opposite to the end of a frame 200 of an ADF 103.

Figure 13:
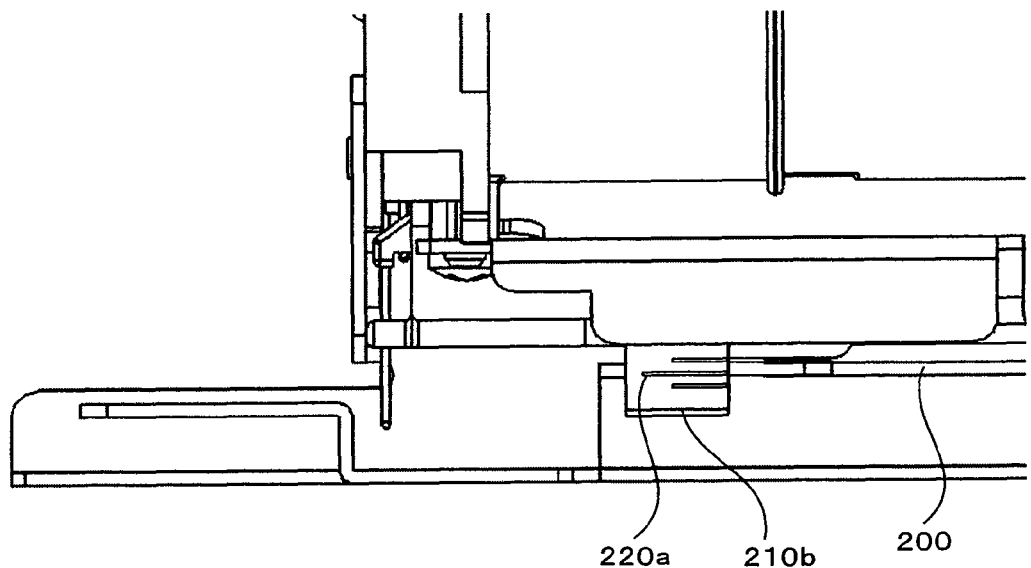
FIG. 13 is a view showing a scale provided on an indicator of a free bracket of a third embodiment.

FIG. 13 is a view showing the scale 220a provided on the indicator 210b of a free bracket 210 of the third embodiment. As shown in FIG. 13, the scale 220a indicates an allowable range of an image reading gap. The allowable range can be made easily viewable by color coding.

Accordingly, similarly to the second embodiment, the image reading gap can be adjusted while seeing the scale 220a.

As stated above, the gap indicator device of the embodiment includes the scale 220a on the indicator 210b. Thus, there is an effect that the workability of the adjustment is further improved.

Fourth Embodiment

A fourth embodiment is different from the first embodiment in that an indicator 210b of a free bracket 210 includes a long pointer 210d long in the longitudinal direction of a platen guide 207, and the long pointer 210d of the free bracket 210 at the front side and the long pointer 210d of the free bracket 210 at the rear side are positioned at an upper part of one scale 220. Besides, in order to prevent the damage of the long pointer 210d, the scale 220 is provided to be extended in the longitudinal direction of a frame 200 stretched between the front side and the rear side of an ADF 103, and the sizes of the long pointers 210d at the front side and the rear side may be adjusted to be short.

Figure 14:
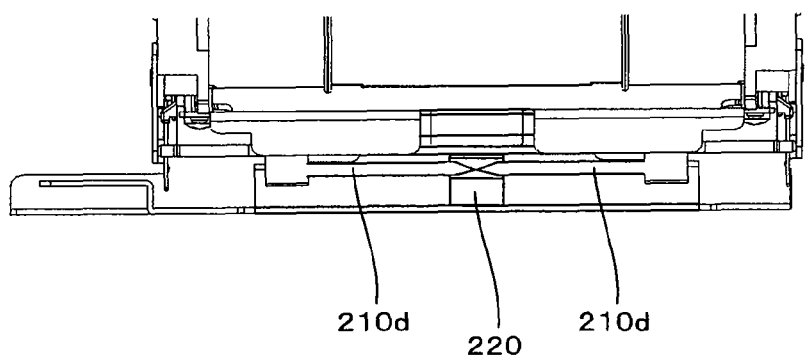
FIG. 14 is a view of a free bracket of a fourth embodiment seen from an upper part of an ADF.
Figure 15:
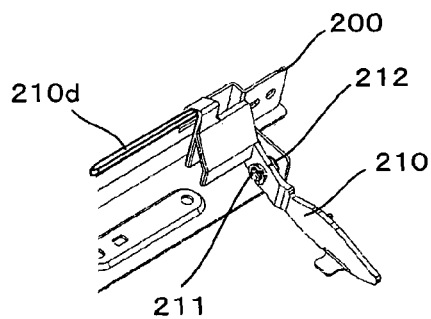
FIG. 15 is an outer appearance perspective view of the free bracket of the fourth embodiment.

FIG. 14 is a view of the free bracket 210 of the fourth embodiment seen from above the ADF 103. FIG. 15 is an outer appearance perspective view of the free bracket 210 of the fourth embodiment.

As shown in FIG. 14 and FIG. 15, the free bracket 210 includes the long pointer 210d long along the frame 200 of the ADF 103. The ADF 103 includes the free bracket 210 constituting a gap indicator device at both ends of the platen guide 207, that is, the front side and the rear side.

The long pointers 210d of the respective free brackets 210 are opposite to each other at the upper part of the scale 220 provided on the frame of the ADF 103. The scale 220 indicates an allowable range of an image reading gap.

As stated above, the gap indicator device of the embodiment includes the long pointers 210d opposite to each other at one place above the scale provided in the ADF 103. Thus, the states of the image reading gap at two places can be visually recognized at the one place, and there is an effect that the workability can be further improved.

Fifth Embodiment

Hereinafter, a fifth embodiment of a gap indicator device will be described. The gap indicator device of the embodiment is formed while a platen guide 300 is made a main body part.

Figure 16:
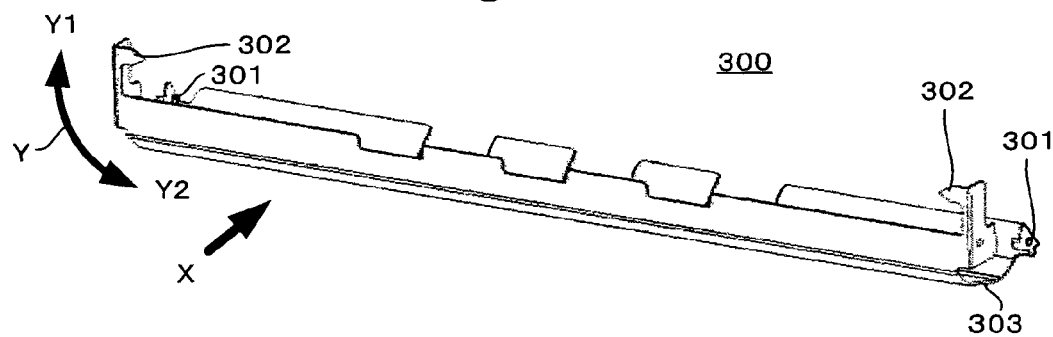
FIG. 16 is a perspective view of a platen guide of a fifth embodiment.
Figure 17:
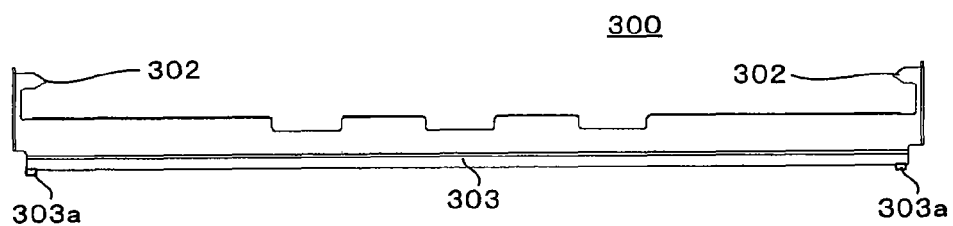
FIG. 17 is a view of the platen guide of FIG. 16 seen from a direction of an arrow X.

FIG. 16 is a perspective view of the platen guide 300. FIG. 17 is a view of the platen guide 300 of FIG. 16 seen from a direction of an arrow X. As shown in FIG. 16, the platen guide 300 includes locking portions 301 at both ends. A shaft provided on the frame 200 of the ADF 103 passes through the locking portions 301 and the locking portions are rotatably locked.

As shown in FIG. 16 and FIG. 17, the platen guide 300 includes pointers 302 at both ends. Each of the pointers 302 has a sufficient length so that it can be seen from above when the upper cover of the ADF 103 is opened.

The platen guide 300 of the embodiment includes a bottom portion 303 in contact with the scanner device 104 so that an image reading gap is formed between the platen guide and the image reading portion 208. The platen guide 300 is urged in a Y2 direction of an arrow Y by a spring (not shown) provided in the locking portion 301.

When the ADF 103 is closed and the bottom portion 303 contacts with a reading gap locating portion (not shown) of the scanner device 104, the platen guide 300 rotates in the Y1 direction of the arrow Y while the locking portion 301 is made a fulcrum and the bottom portion 303 is made the point where force is applied. When the platen guide 300 rotates, the position of the pointer 302 is changed, and therefore, the image reading gap can be read by the pointer 302.

A scale may be provided on the frame of the ADF 103 where the pointer 302 is positioned. Besides, the pointer 302 may be a long pointer extending in the longitudinal direction of the platen guide 300. One scale is located at tip portions of the pointers 302 at both ends, and each of the pointers is constructed to have a sufficient length so that the tip end of the long pointer reaches the scale. The image reading gap at the rear side of the ADF 103 and the image reading gap at the front side can be simultaneously confirmed.

Further, as shown in FIG. 17, a convex reading gap locating portion 303a to regulate the position of the bottom portion 303 of the platen guide 300 is provided at both ends of the bottom portion 303, and is arranged so that when the ADF 103 is closed, the reading gap locating portion 303a contacts with the image reading portion 208. By this, the image reading gap having the width equivalent to the convex height of the reading gap locating portion 303a is ensured.

As stated above, the gap indicator device of the embodiment includes the bottom portion 303 that is rotatably locked to the frame 200 of the ADF 103 while the locking portion 301 is made the fulcrum and is pressed by the scanner device 104, and the pointer 302 indicating the state of the image reading gap when the bottom portion 303 is rotated by being pressed by the scanner device 104.

Incidentally, the structure of the gap indicator device of the embodiment can be applied to an ADF of a type in which a conveying guide member corresponding to the platen guide 207 or 300 is constructed of a wide conveying belt and an original document conveyed on the platen is read.

Thus, in the gap indicator device of the embodiment, the state of the image reading gap of the image scanning apparatus can be easily confirmed, the image reading gap can be re-adjusted while the image scanning apparatus is installed to the main body apparatus 101 of the image forming apparatus, and there is an effect that the workability is improved.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An auto document feeder openably and closably installed to a scanner device, comprising:
   a document feed tray on which an original document is placed;
   a document conveying mechanism to convey the original document one by one from the document feed tray to an image reading portion of a scanning unit;
   a document storage tray on which the original document ejected by the document conveying mechanism is placed; and
   a gap indicator device that includes an indicator to indicate a state of an image reading gap between a conveying guide member and the image reading portion through which the original document passes, is rotatably locked to a frame, is rotated by being pressed by the scanner device, includes, at one end, an actuating lever portion in contact with a part of the scanner device, and includes, at the other end, the indicator provided with a pointer and having a scale.

2. The auto document feeder of claim 1, wherein the actuating lever portion includes a locating portion to regulate the image reading gap.

3. The auto document feeder of claim 1, further comprising an urging member that urges the gap indicator device to rotate the gap indicator device in a direction of the scanner device.

4. The auto document feeder of claim 1, wherein the pointer is located at a position where it can be visually recognized from above when a cover of the auto document feeder is opened.

5. The auto document feeder of claim 1, further comprising a scale at a place of the auto document feeder opposite to the pointer.

6. The auto document feeder of claim 1, further comprising:
   one scale at a place of the frame opposite to the pointer; and
   a long pointer that is the pointer extended to the scale.

7. The auto document feeder of claim 1, wherein the conveying guide member includes a bottom portion pressed by the scanner device, and a pointer to indicate a state of the image reading gap when the bottom portion is rotated by being pressed by the scanner device.

8. The auto document feeder of claim 7, wherein the pointer is located at a position where it can be visually recognized from above when a cover of the auto document feeder is opened, and a scale is provided at a place opposite to the pointer.

9. An image scanning apparatus comprising:
   a scanner device including a document stand on which an original document is placed, and a scanning unit to optically read an image of the original document placed on the document stand; and
   an auto document feeder including a document feed tray on which the original document is placed, a document conveying mechanism to convey the original document one by one from the document feed tray to an image reading portion of the scanning unit,
   a document storage tray on which the original document ejected by the document conveying mechanism is placed, and a gap indicator device that includes an indicator to indicate a state of an image reading gap between a conveying guide member and the image reading portion through which original document passes, is rotatably locked to a frame, is rotated by being pressed by the scanner device, and includes, at one end, an actuating lever portion in contact with a part of the scanner device, and includes, at the other end, the indicator provided with a pointer and having a scale.

10. The apparatus of claim 9, further comprising an urging member that urges the gap indicator device to rotate the gap indicator device in a direction of the scanner device.

11. The apparatus of claim 9, wherein the pointer is located at a position where it can be visually recognized from above when a cover of the auto document feeder is opened.

12. The apparatus of claim 9, further comprising a scale at a place of the auto document feeder opposite to the pointer.

13. The apparatus of claim 9, further comprising:
one scale at a place of the frame of the auto document feeder opposite to the pointer; and
a long pointer that is the pointer extended to the scale.

14. The apparatus of claim 9, wherein the conveying guide member includes a bottom portion pressed by the scanner device, and a pointer to indicate a state of the image reading gap when the bottom portion is rotated by being pressed by the scanner device.

15. The apparatus of claim 14, wherein
the pointer is located at a position where it can be visually recognized from above when a cover of the auto document feeder is opened, and
a scale is provided at a place of the auto document feeder opposite to the pointer.

16. A state indicating method of an image reading gap of an image scanning apparatus, comprising:
rotatably locking a gap indicator device including a pointer or a scale to an auto document feeder at a position where the pointer or the scale can be visually recognized from above when a cover of the auto document feeder openably and closably installed to a scanner device is opened;
rotating an indicator including the pointer or the scale by pressing one end of the gap indicator device when the auto document feeder is closed; and
indicating, by the pointer or the scale, a state of the image reading gap, as a gap between a platen guide and an image reading portion, through which an original document passes.

\* \* \* \* \*